United States Patent
Brown et al.

(10) Patent No.: US 7,093,912 B2
(45) Date of Patent: Aug. 22, 2006

(54) CONTROL OF REGENERATIVE BRAKING DURING A YAW STABILITY CONTROL EVENT

(75) Inventors: Todd Allen Brown, Dearborn, MI (US); Michael John Schneider, Bloomfield Township, MI (US)

(73) Assignee: Ford Motor Company, Dearborn, MI (US)

( * ) Notice: Subject to any disclaimer, the term of this patent is extended or adjusted under 35 U.S.C. 154(b) by 22 days.

(21) Appl. No.: 10/932,132

(22) Filed: Sep. 1, 2004

(65) Prior Publication Data

US 2005/0029863 A1    Feb. 10, 2005

Related U.S. Application Data

(63) Continuation-in-part of application No. 10/064,159, filed on Jun. 17, 2002, now abandoned.

(51) Int. Cl.
  *B60T 8/60* (2006.01)
  *B60T 8/64* (2006.01)
(52) U.S. Cl. ...................... 303/146; 303/152
(58) Field of Classification Search ........... 303/146, 303/147, 148, 152; 701/72
See application file for complete search history.

(56) References Cited

U.S. PATENT DOCUMENTS

| | | | |
|---|---|---|---|
| 4,181,188 A | 1/1980 | Dessert | |
| 4,335,337 A | 6/1982 | Okamatsu et al. | |
| 4,671,577 A | 6/1987 | Woods | |
| 4,741,410 A | 5/1988 | Tunmore | |
| 5,318,355 A | 6/1994 | Asanuma et al. | 303/3 |
| 5,343,970 A | 9/1994 | Severinsky | |
| 5,465,806 A | 11/1995 | Higasa et al. | |
| 5,473,990 A | 12/1995 | Anderson et al. | |
| 5,476,310 A | 12/1995 | Ohtsu et al. | |
| 5,505,527 A | 4/1996 | Gray, Jr. et al. | |
| 5,511,859 A * | 4/1996 | Kade et al. | 303/3 |
| 5,615,933 A | 4/1997 | Kidston et al. | |
| 5,654,887 A | 8/1997 | Asa et al. | |
| 5,707,115 A * | 1/1998 | Bodie et al. | 303/152 |
| 6,033,041 A | 3/2000 | Koga et al. | |
| 6,070,953 A * | 6/2000 | Miyago | 303/152 |
| 6,231,134 B1 * | 5/2001 | Fukasawa et al. | 303/152 |
| 6,454,364 B1 * | 9/2002 | Niwa et al. | 303/152 |
| 6,615,124 B1 * | 9/2003 | Adachi | 303/145 |
| 6,691,013 B1 * | 2/2004 | Brown | 303/152 |

* cited by examiner

*Primary Examiner*—Thomas Williams
(74) *Attorney, Agent, or Firm*—David B. Kelley; Artz and Artz

(57) ABSTRACT

The present invention is a method and system to control regenerative braking during the operation of a yaw stability control system. The method and system use feedback control algorithms to monitor and dynamically modify regenerative and non-regenerative braking. The controller can use a simple proportional-integral-derivative feedback controller. A vehicle yaw stability control system can determine if a vehicle is experiencing an oversteer or understeer condition. The controller compares actual brake balance to a desired brake balance. The controller determines if the front axle wheels are overbraked relative to the rear axle wheels or if the rear axle wheels are overbraked relative to the front axle wheels as compared to the desired brake balance. The controller can adjust regenerative braking and non-regenerative braking levels according to the determinations.

32 Claims, 3 Drawing Sheets

CONTROL OF REGENERATIVE BRAKING DURING A YAW STABILITY CONTROL EVENT

This application is a continuation-in-part of U.S. application Ser. No. 10/064,159 filed Jun. 17, 2002 now abandoned.

DESCRIPTION

The present invention relates generally to vehicle braking and controllability control systems, commonly referred to as yaw stability systems, and specifically to a braking and controllability control method and system for a vehicle with regenerative braking during the operation of a yaw stability control system.

The need to reduce fossil fuel consumption and emissions in automobiles and other vehicles predominately powered by internal combustion engines (ICEs) is well known. Vehicles powered by electric motors attempt to address these needs. Another alternative solution is to combine a smaller ICE with electric motors into one vehicle. Such vehicles combine the advantages of an ICE vehicle and an electric vehicle and are typically called hybrid electric vehicles (HEVs). See generally, U.S. Pat. No. 5,343,970 to Severinsky.

The HEV is described in a variety of configurations. Many HEV patents disclose systems where an operator is required to select between electric and internal combustion operation. In other configurations, the electric motor drives one set of wheels and the ICE drives a different set.

Other, more useful, configurations have developed. For example, a series hybrid electric vehicle (SHEV) configuration is a vehicle with an engine (most typically an ICE) connected to an electric motor called a generator. The generator, in turn, provides electricity to a battery and another motor, called a traction motor. In the SHEV, the traction motor is the sole source of wheel torque. There is no mechanical connection between the engine and the drive wheels. A parallel hybrid electrical vehicle (PHEV) configuration has an engine (most typically an ICE) and an electric motor that work together in varying degrees to provide the necessary wheel torque to drive the vehicle. Additionally, in the PHEV configuration, the motor can be used as a generator to charge the battery from the power produced by the ICE.

A parallel/series hybrid electric vehicle (PSHEV) has characteristics of both PHEV and SHEV configurations and is sometimes referred to as a "powersplit" configuration. In one of several types of PSHEV configurations, the ICE is mechanically coupled to two electric motors in a planetary gear set transaxle. A first electric motor, the generator, is connected to a sun gear. The ICE is connected to a carrier gear. A second electric motor, a traction motor, is connected to a ring (output) gear via additional gearing in a transaxle. Engine torque can power the generator to charge the battery. The generator can also contribute to the necessary wheel (output shaft) torque if the system has a one-way clutch. The traction motor is used to contribute wheel torque and to recover braking energy to charge the battery. In this configuration, the generator can selectively provide a reaction torque that may be used to control engine speed. In fact, the engine, generator motor and traction motor can provide a continuous variable transmission (CVT) effect. Further, the HEV presents an opportunity to better control engine idle speed over conventional vehicles by using the generator to control engine speed.

The desirability of combining an ICE with electric motors is clear. There is great potential for reducing vehicle fuel consumption and emissions with no appreciable loss of vehicle performance or driveability. The HEV allows the use of smaller engines, regenerative braking, electric boost, and even operating the vehicle with the engine shut down. Nevertheless, new ways must be developed to optimize the HEV's potential benefits.

One such area of HEV development is optimizing the braking and controllability system of the HEV or any other type of vehicle using regenerative braking technology. Regenerative braking (regen) captures the kinetic energy of the vehicle as it decelerates. In conventional vehicles, kinetic energy usually dissipates as heat in the vehicle's brakes or engine during deceleration. Regen converts the captured kinetic energy through a generator into electrical energy in the form of a stored charge in the vehicle's battery. This stored energy is later used to power the electric motor. Consequently, regen also reduces fuel usage and emission production. In certain vehicle configurations, the engine can be disconnected from the rest of the powertrain thereby allowing more of the kinetic energy to be converted into stored electrical energy.

On most vehicles with regenerative braking, the regenerative braking torque is applied only to, or predominantly to, the wheels of one axle. When regenerative braking is applied to only the wheels of one axle, non-regenerative braking methods may be used at the wheels of the other axles. Non-regenerative brakes are also commonly installed at the wheels of the axles having regenerative braking to supplement or back-up the regenerative braking. The desire to recover energy through regenerative braking can result in unbalanced braking torques being applied to the wheels of the different axles. As used herein, the term "balanced braking" means that braking torque is being applied at a proportionate weight on each axle. The term "overbraking" means that the applied braking torque on a particular axle, whether from regenerative brakes, non-regenerative brakes, or both, exceeds the balanced braking torque for that axle.

Overbraking can affect vehicle controllability. These controllability effects can be in the form of either oversteer or understeeer. When overbraking occurs at the front axle, it reduces the ability of the front wheels to steer the vehicle, a condition known as understeer. This means, for example, that the front of the vehicle will slide to the outside of a curve when cornering. When overbraking occurs at the rear axle, it reduces the lateral friction of the rear tires, a condition known as oversteer. This means that the rear end of a vehicle will slide to the outside of a curve when cornering. These effects, understeer due to overbraking at the front axle, and oversteer due to overbraking at the rear axle, can become severe on low friction surfaces such as ice and snow. The requirement for controllability on low friction surfaces typically forces regenerative braking levels to be reduced, resulting in a corresponding loss of energy recovery.

There are HEV patents to control regenerative braking functions in various driving conditions. Koga et al. (U.S. Pat. No. 6,033,041) describes a regenerative braking control system for an electric vehicle where the regenerative braking varies as a function of vehicle inclination. Okamatsu (U.S. Pat. No. 4,335,337) describes a control system for an electric powered vehicle. This invention attempts to improve tire grip performance by adjusting the frequency of the rotations of the induction motors based on the slip frequency of the vehicle without regard to regenerative braking.

Ohtsu et al. (U.S. Pat. No. 5,476,310) also attempts to improve braking performance through the cooperation of mechanical anti-lock brakes and regenerative braking. This invention regulates excessive braking force and slip with a controller using a predetermined slip ratio. Other inventions also attempt to regulate excessive slip. See Asa et al. (U.S. Pat. No. 5,654,887) and Kidston et al. (U.S. Pat. No. 5,615,933). Unfortunately, while these inventions do reduce excessive slip, they do not provide an adequate level of stability because they focus mainly on the maximization of straight line stopping.

Asanuma et al. (U.S. Pat. No. 5,318,355), describes a switchover mode from a regenerative or friction braking mode of operation. Unfortunately, this invention is susceptible to false activation of the mode switchover.

Thus, no prior art patents adequately address the desire and need to distribute brake torque between regenerative and non-regenerative braking during the operation of a yaw stability control system.

SUMMARY OF INVENTION

Accordingly, the present invention is a method and system for controlling regenerative and non-regenerative braking during operation of a yaw stability control system. The invention can provide regenerative braking during the operation of a yaw stability control system even on low friction surfaces while not significantly reducing energy recovery. The invention uses a yaw stability control system to determine if a decrease in controllability is an understeer or oversteer condition and correspondingly adjusts regenerative braking torque.

Specifically, the present invention has mechanical friction or other non-regenerative brakes known in the art connected to the wheels of at least one axle. An electric motor comprising the ability to provide regenerative braking torque is connected to the wheels of at least one axle. The present invention has a controller having the ability to receive input from a yaw stability control system, compare actual braking balance to a desired brake balance, determine if the front axle wheels or rear axle wheels are overbraked as compared to the desired brake balance, and adjust regenerative braking and non-regenerative braking levels. The controller can use a simple proportional-integral-derivative feedback controller.

In rear wheel drive vehicle configurations regenerative braking torque is applied to the rear axle wheels, and the non-regenerative brakes are connected to the front axle wheels. Non-regenerative brakes may also be connected to the rear axle wheels to supplement and/or back-up regenerative braking. The vehicle yaw stability control system will determine if the vehicle is experiencing an oversteer or understeer condition. If the vehicle is experiencing an oversteer condition and the rear axle wheels are overbraked relative to the front axle wheels as compared to a desired brake balance, regenerative braking is reduced or phased out completely. Otherwise, regenerative braking is maintained at the current level.

In front wheel drive vehicle configurations regenerative braking torque is applied to the front axle wheels, and the non-regenerative brakes are connected to the rear axle wheels. Non-regenerative brakes may also be connected to the front axle wheels to supplement and/or back-up regenerative braking. The vehicle yaw stability control system will determine if the vehicle is experiencing an oversteer or understeer condition. If the vehicle is experiencing an understeer condition and the front axle wheels are overbraked relative to the rear axle wheels as compared to a desired brake balance, regenerative braking is reduced or phased out completely. Otherwise, regenerative braking is maintained at the current level.

The present invention is to provide a strategy to control regenerative braking and non-regenerative braking during the operation of a yaw stability control system.

Other objects of the present invention will become more apparent to persons having ordinary skill in the art to which the present invention pertains from the following description taken in conjunction with the accompanying figures.

BRIEF DESCRIPTION OF DRAWINGS

The foregoing advantages and features, as well as other advantages and features, will become apparent with reference to the description and figures below, in which like numerals represent like elements and in which.

DETAILED DESCRIPTION

Figure 1:
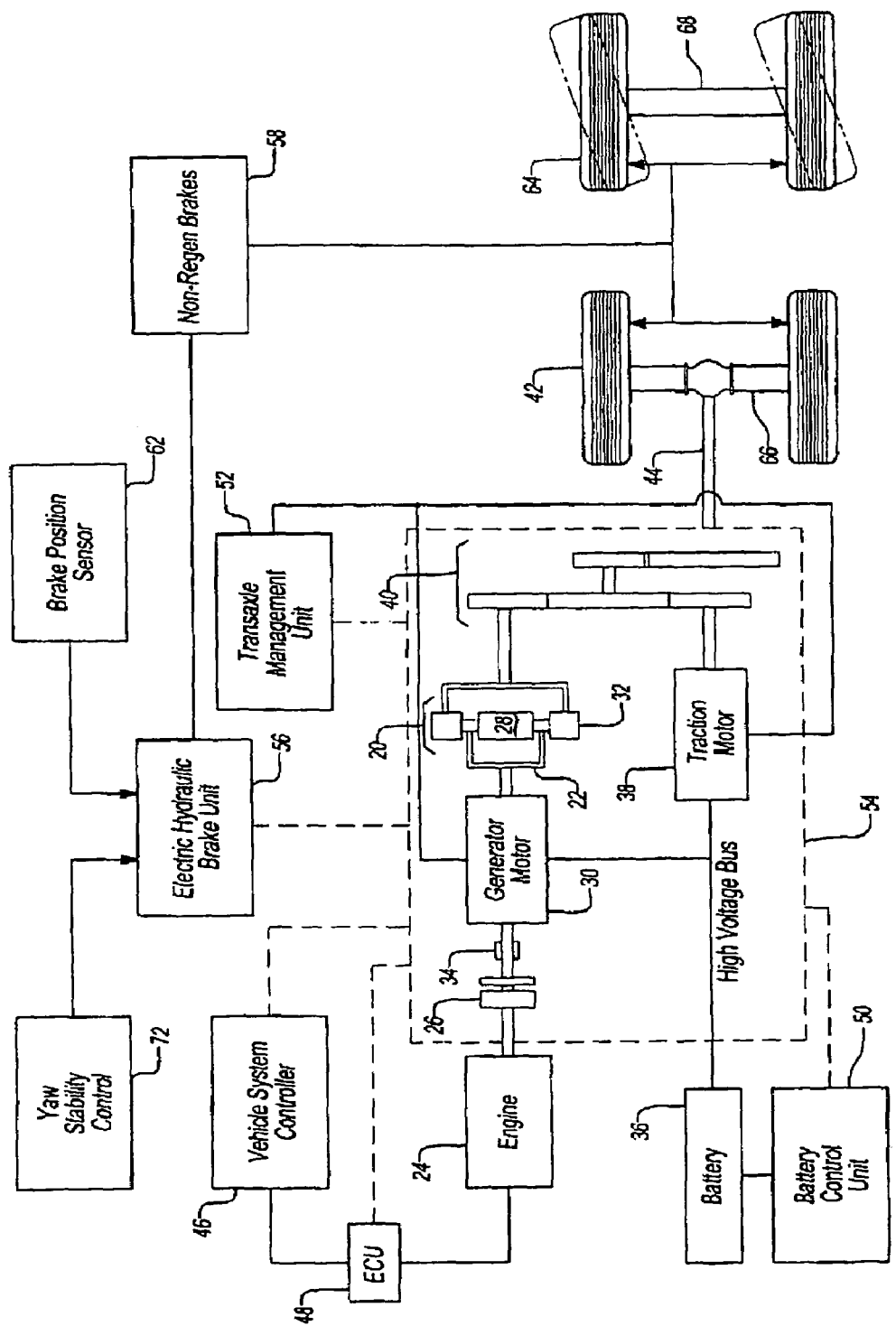
FIG. 1 illustrates a general rear wheel drive hybrid electric vehicle (HEV) configuration.

The present invention relates to electrically propelled vehicles such as electric vehicles (EVs), hybrid electric vehicles (HEVs), and fuel cell electric vehicles (FCEVs) that have a regenerative braking system. The present invention is a system to control regenerative braking for a vehicle during the operation of a yaw stability control system. FIG. 1 demonstrates just one possible configuration, specifically a parallel/series hybrid electric vehicle (powersplit) configuration. However, it should be understood that the present invention applies to any vehicle with regenerative braking and a yaw stability control system.

In a basic HEV, a planetary gear set 20 mechanically couples a carrier gear 22 to an engine 24 via a one-way clutch 26. The planetary gear set 20 also mechanically couples a sun gear 28 to a generator motor 30 and a ring (output) gear 32. The generator motor 30 also mechanically links to a generator brake 34 and is electrically linked to a battery 36. A traction motor 38 is mechanically coupled to the ring gear 32 of the planetary gear set 20 via a second gear set 40 and is electrically linked to the battery 36. The ring gear 32 of the planetary gear set 20 and the traction motor 38 are mechanically coupled to rear axle wheels 42 via an output shaft 44 that is mechanically coupled to a rear axle 66 having the rear axle wheels 42. For purposes of illustration, the vehicle can also have a separate pair of front axle wheels 64 connected by a front axle 68 that are non-driven and are steerable. The front axle wheels 64 are positioned toward the front of the vehicle and the rear axle wheels 42 are positioned toward the rear of the vehicle.

The planetary gear set 20, splits the engine 24 output energy into a series path from the engine 24 to the generator motor 30 and a parallel path from the engine 24 to the rear axle wheels 42. Engine 24 speed can be controlled by varying the split to the series path while maintaining the mechanical connection through the parallel path. The traction motor 38 augments the engine 24 power to the rear axle wheels 42 on the parallel path through the second gear set 40. The traction motor 38 also provides the opportunity to use energy directly from the series path, essentially running off power created by the generator motor 30. This reduces losses associated with converting energy into and out of chemical energy in the battery 36 and allows all engine 24 energy, minus conversion losses, to reach the rear axle wheels 42.

A vehicle system controller (VSC) 46 controls many components in this HEV configuration by connecting to each component's controller. An engine control unit (ECU) 48 connects to the engine 24 via a hardwire interface. All vehicle controllers can be physically combined in any combination or can stand as separate units. They are described as separate units here because they each have distinct functionality. The VSC 46 communicates with the ECU 48, as well as a battery control unit (BCU) 50 and a transaxle management unit (TMU) 52 through a communication network such as a controller area network (CAN) 54. The BCU 50 connects to the battery 36 via a hardwire interface. The TMU 52 controls the generator motor 30 and the traction motor 38 via a hardwire interface.

Further, the VSC 46 can communicate with an electric hydraulic braking unit (EHBU) 56 through the CAN 54. The EHBU 56 is connected to non-regenerative brakes 58 that ultimately are connected to the front axle wheels 64. The non-regenerative brakes 58 can also be connected to the rear axle wheels 42. The EHBU 56 can control anti-lock braking systems (ABS) (not shown), regenerative braking, traction control systems (not shown), a yaw stability control system 72, and the non-regenerative brakes 58. The EHBU 56 can control these systems either in response to operator input or independent of operator input. In the present invention, braking control for the rear axle wheels 42 and the front axle wheels 64 is independently available. The EHBU 56 can receive input from various vehicle systems. Specific to the present invention are inputs for a brake position sensor 62 (such as a brake pedal), and the yaw stability control system 72.

The present invention is a method and system to control regenerative braking and non-regenerative braking during operation of the yaw stability control system for a vehicle equipped with regenerative braking, such as the configuration illustrated in FIG. 1. The invention can provide regenerative braking in the event of oversteer and understeer conditions even on low friction surfaces. The controller of the present invention can be physically located either within the VSC 46 or as a stand-alone unit, such as the EHBU 56. The controller receives input from the yaw stability control system 72, compares actual braking to a desired brake balance and correspondingly commands a reduction or maintenance of regenerative braking. The desired brake balance is a representation of an ideal brake balance or a brake balance that is normally achieved with conventional non-regenerative braking.

As stated above, most vehicle configurations with regenerative braking apply braking torque to the wheels of one axle (or predominately to the wheels of one axle). When regenerative braking is applied to only the wheels of one axle, conventional non-regenerative braking methods can be used at the wheels of the other axles to balance the vehicle's overall braking torque. The non-regenerative brakes 58 may also be used at the wheels of the axle having regenerative braking to supplement and/or back-up the regenerative braking. To demonstrate this in the vehicle configuration in FIG. 1, the EHBU 56 could command regenerative braking at the rear axle wheels 42 of the rear axle 66 (i.e., a rear wheel drive configuration). The EHBU 56 could concurrently command an application of the conventional non-regenerative brakes 58 to the front axle wheels 64 of the front axle 68. Unfortunately, in this example optimal regenerative energy is not realized because any braking torque using the non-regenerative brakes 58 results in kinetic energy wasted as heat. Ideally, maximum energy recovery would occur with complete regenerative braking.

The challenge of maximum energy recovery through regenerative braking is that unbalanced braking torques between the front axle wheels 64 and the rear axle wheels 42 can affect vehicle controllability. For example, in a front wheel drive vehicle configuration (not shown), if a disproportionate amount of braking torque is applied to the front axle wheels 64 of the front axle 68 in an attempt to maximize energy recovery (e.g., less non-regenerative braking force is applied to the rear axle wheels 42 than the desired brake balance would call for), the ability to steer the front axle wheels 64 is reduced (understeer). In a rear wheel drive vehicle configuration, when a disproportionate amount of braking torque is applied at the rear axle wheels 42 of the rear axle 66 in an attempt to maximize energy recovery (e.g., less non-regenerative braking force is applied to the front axle wheels 64 than the desired brake balance would call for), the lateral friction of the rear axle wheels 42 is reduced (oversteer). These controllability conditions can become more severe on low friction surfaces such as ice and snow.

Figure 2:
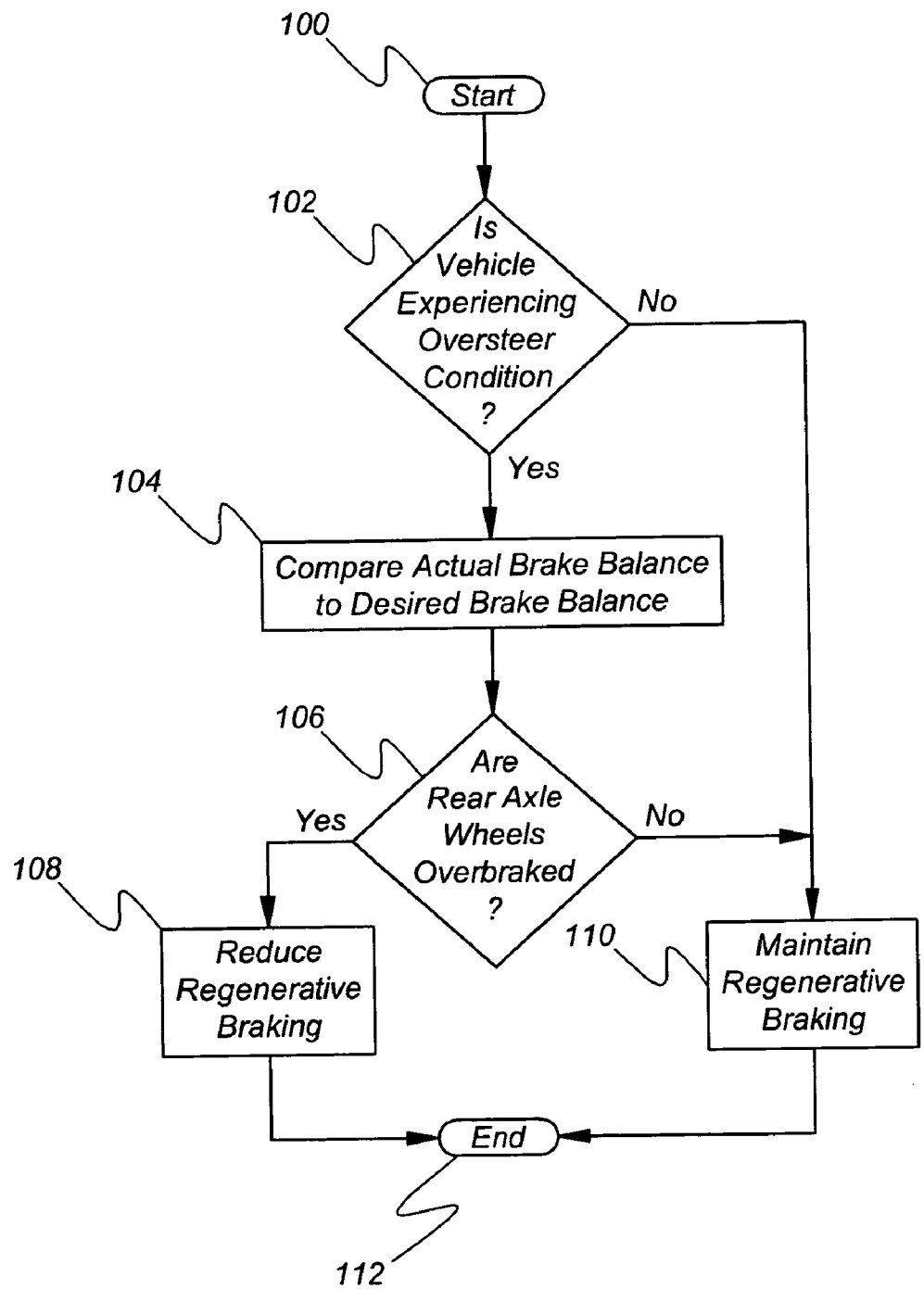
FIG. 2 illustrates a braking and controllability control strategy of the present invention for a rear wheel drive vehicle.

FIG. 2 illustrates a braking and controllability control strategy of the present invention for a rear wheel drive vehicle. In rear wheel drive vehicle configurations, regenerative braking torque is applied to the rear axle wheels 42, and the non-regenerative brakes 58 are connected to the front axle wheels 64. The non-regenerative brakes 58 may also be connected to the rear axle wheels 42 to supplement and/or back-up regenerative braking. The strategy starts at step 100. At step 102 the yaw stability control system 72 determines if the vehicle is experiencing an oversteer condition. If the vehicle is experiencing an oversteer condition, the strategy proceeds to step 104. If the vehicle is not experiencing an oversteer condition, the strategy proceeds to step 110 where regenerative braking is commanded to be maintained at the current level. Following step 110, the strategy ends at step 112.

At step 104 the actual brake balance is compared to the desired brake balance and the strategy proceeds to step 106. At step 106 the strategy determines if the rear axle wheels 42 are overbraked relative to the front axle wheels 64 as compared to the desired brake balance. If the rear axle wheels 42 are overbraked, the strategy proceeds to step 108. Otherwise, the strategy proceeds to step 110.

At step 108, the strategy commands a reduction in regenerative braking until the desired brake balance is achieved or regenerative braking is phased out completely. When regenerative braking is reduced or phased out, the strategy switches to non-regenerative braking that is distributed to achieve the desired brake balance. Following step 108, the strategy ends at step 112.

Returning to step 106, if the strategy determines the rear axle wheels 42 are not overbraked relative to the front axle wheels 64 as compared to the desired brake balance, the strategy proceeds to step 110. Following step 110, the strategy ends at step 112.

Figure 3:
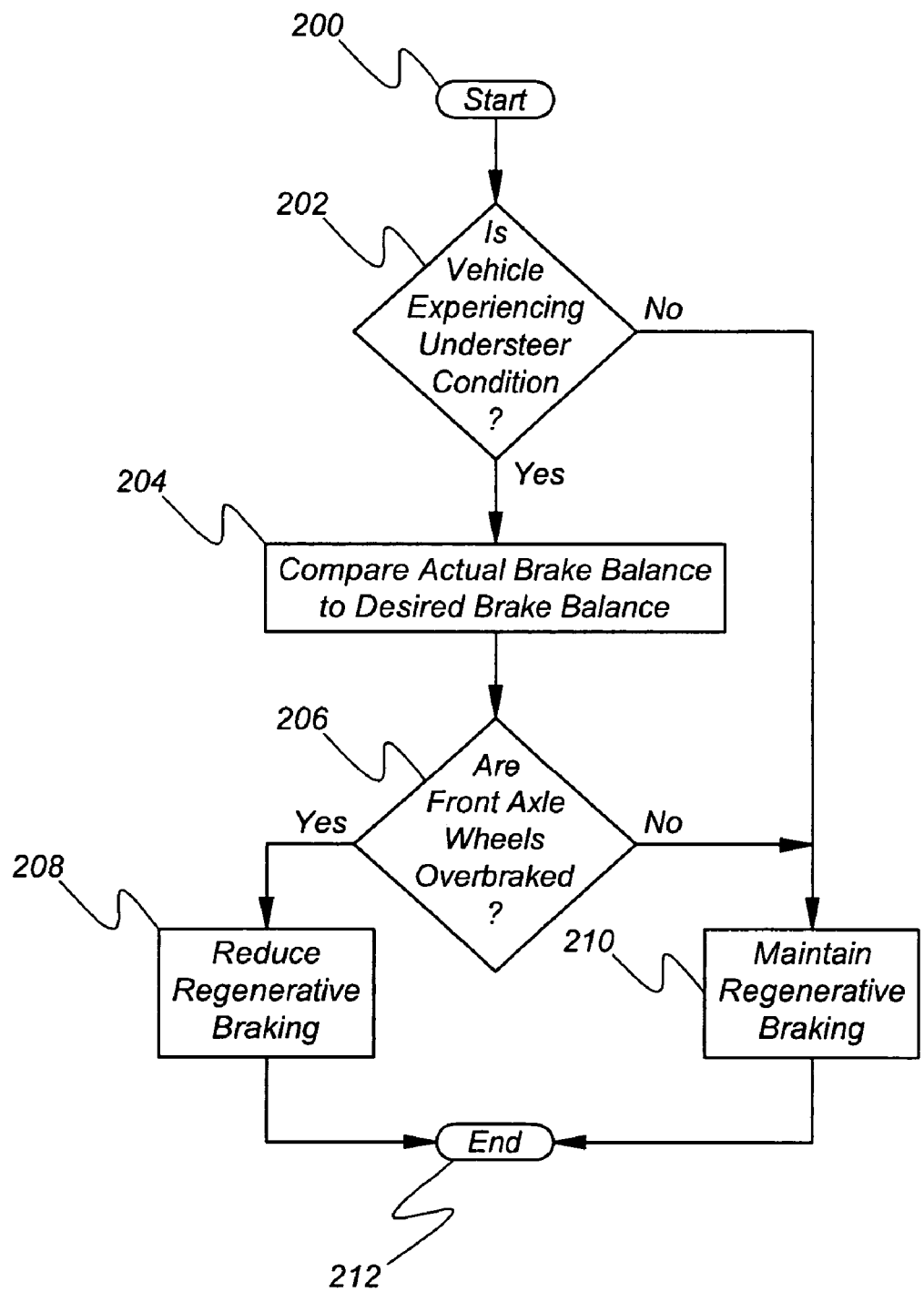
FIG. 3 illustrates a braking and controllability control strategy of the present invention for a front wheel drive vehicle.

FIG. 3 illustrates the braking and controllability control strategy of the present invention for a front wheel drive vehicle. In front wheel drive vehicle configurations, regenerative braking torque is applied to the front axle wheels 64 and non-regenerative brakes 58 are connected to the rear axle wheels 42. The non-regenerative brakes 58 may also be connected to the front axle wheels 64 to supplement and/or back-up regenerative braking. The strategy starts at step 200. At step 202 yaw stability control system 72 determines if the vehicle is experiencing an understeer condition. If the vehicle is not experiencing an understeer condition, the strategy proceeds to step 210 where regenerative braking is commanded to be maintained at the current level. Following step 210, the strategy ends at step 212. If the vehicle is experiencing an understeer condition, the strategy proceeds to step 204.

At step 204 the actual brake balance is compared to the desired brake balance and the strategy proceeds to step 206. At step 206 the strategy determines if the front axle wheels 64 are overbraked relative to the rear axle wheels 42 as compared to the desired brake balance. If the front axle wheels 64 are overbraked, the strategy proceeds to step 208. Otherwise, the strategy proceeds to step 210.

At step 208, the strategy commands a reduction in regenerative braking until the desired brake balance is achieved or regenerative braking is phased out completely. When regenerative braking is reduced or phased out, the strategy switches to non-regenerative braking that is distributed to achieve the desired brake balance. Following step 208, the strategy ends at step 212.

Returning to step 206, if the strategy determines the front axle wheels 64 are not overbraked as compared to the desired brake balance, the strategy proceeds to step 210. Following step 210, the strategy ends at step 212.

When regenerative braking is reduced because of a yaw stability control event, regenerative braking should only be reduced by the amount necessary to achieve the desired brake balance. By reducing regenerative braking only by the amount necessary to achieve the desired brake balance, energy recovery is maximized while vehicle controllability is enhanced.

When regenerative braking is reduced or phased out because of a yaw stability control event, regenerative braking should be reduced gradually over a period of time that provides a quick return to balanced braking. This time period should be long enough to allow the switch between regenerative and non-regenerative braking to be smooth. During the switch, the total braking torque should remain the same. To keep total braking torque the same throughout the switch, non-regenerative braking should be increased or phased in at the same rate regenerative braking is reduced or phased out. A typical time period for such a switch may between 50 msec and 1 sec.

In an alternate embodiment of the present invention, the strategy can switch from regenerative braking to non-regenerative braking while maintaining the brake balance that resulted from regenerative braking. For example, in the situations described above when the controller would command regenerative braking to be maintained at the current level, as illustrated at FIG. 2, 110 and FIG. 3, 210, the strategy can switch, in whole or in part, from regenerative braking to non-regenerative brakes 58 at the axle having regenerative braking with the same actual brake torque. In these situations, the actual brake balance is maintained and the non-regenerative brakes 58 replace, in whole or in part, regenerative braking at the wheels of the axle having regenerative braking.

In this alternate embodiment, energy recovery is forsaken for the few moments of the yaw stability control event in favor of using non-regenerative brakes 58.

The present invention can use feedback control algorithms to monitor and dynamically modify regenerative and non-regenerative braking. For example, a simple proportional-integral-derivative feedback controller can be used.

The above-described embodiments of the invention are provided purely for purposes of example. Many other variations, modifications, and applications of the invention may be made. Variations could include, but are not limited to, applying the invention to all wheel drive vehicles or four wheel drive vehicles. In the case of four wheel drive or all wheel drive vehicles, the regenerative braking may be distributed to more than one axle. The principles described above, of when to maintain or reduce regenerative braking, would still apply.

Additionally, those skilled in the art will understand that the yaw stability control system 72 can give additional braking commands that can be superimposed on the braking commands of the present invention.

What is claimed is:

1. A system to control braking for a vehicle during a yaw stability control event, comprising:
   a yaw stability control system to determine if the vehicle is experiencing an understeer or oversteer condition;
   non-regenerative brakes connected to wheels of at least one axle;
   regenerative braking applied to the wheels of at least one axle; and
   a controller comprising an ability to receive input from the yaw stability control system, compare actual brake balance to a desired brake balance, determine if front axle wheels or rear axle wheels are overbraked as compared to the desired brake balance, and adjust regenerative braking and non-regenerative braking levels.

2. The system of claim 1, wherein the controller is a simple proportional-integral-derivative feedback controller.

3. The system of claim 1, wherein the controller adjusts regenerative braking and non-regenerative braking levels over a period of time that provides a quick return to balanced braking and allows a switch between regenerative and non-regenerative braking to be smooth.

4. The system of claim 1, wherein the controller adjusts regenerative braking and non-regenerative braking levels over a period of time between 50 msec and 1 sec.

5. The system of claim 1, wherein: the non-regenerative brakes are connected to front axle wheels; and regenerative braking is applied to rear axle wheels.

6. The system of claim 5, wherein: the controller reduces regenerative braking when the yaw stability control system determines the vehicle is experiencing said oversteer condition and the rear axle wheels are overbraked relative to the front axle wheels.

7. The system of claim 5, wherein: the controller maintains regenerative braking when the yaw stability control system determines the vehicle is experiencing said understeer condition.

8. The system of claim 5, wherein: the controller maintains regenerative braking when the yaw stability control system determines the vehicle is experiencing said oversteer condition and the rear axle wheels are not overbraked relative to the front axle wheels.

9. The system of claim 5, wherein: the non-regenerative brakes are also connected to the rear axle wheels; and the controller switches from regenerative braking to non-regenerative braking at the rear axle wheels when the yaw stability control system determines the vehicle is experiencing said understeer condition.

10. They system of claim 5 wherein: the non-regenerative brakes are also connected to the rear axle wheels; and the controller switches from regenerative braking to non-regenerative braking at the rear axle wheels when the yaw stability control system determines the vehicle is experiencing said understeer condition.

11. The system of claim 1, wherein: the non-regenerative brakes are connected to rear axle wheels; and regenerative braking is applied to front axle wheels.

12. The system of claim 11, wherein: the controller reduces regenerative braking when the yaw stability control system determines the vehicle is experiencing said understeer condition and the front axle wheels are overbraked relative to the rear axle wheels.

13. The system of claim 11, wherein: the controller maintains regenerative braking when the yaw stability control system determines the vehicle is experiencing said oversteer condition.

14. The system of claim 11, wherein: the controller maintains regenerative braking when the yaw stability control system determines the vehicle is experiencing said understeer condition and the front axle wheels are not overbraked relative to the rear axle wheels.

15. They system of claim 11, wherein: the non-regenerative brakes are also connected to the front axle wheels; and the controller switches from regenerative braking to non-regenerative braking at the front axle wheels when the yaw stability control system determines the vehicle is experiencing said oversteer condition.

16. The system of claim 11, wherein: the non-regenerative brakes are also connected to the front axle wheels; and the controller switches from regenerative braking to non-regenerative braking at the front axle wheels when the yaw stability control system determines the vehicle is experiencing said understeer condition and the front axle wheels are not overbraked relative to the rear axle wheels.

17. A method to control regenerative braking for a vehicle having a yaw stability control system, an ability to provide regenerative braking torque to wheels of at least one axle, non-regenerative brakes connected to the wheels of at least one axle, the method comprising the steps of: determining in the yaw stability control system if the vehicle is experiencing an understeer or oversteer condition; and controlling the vehicle by receiving input from the yaw stability control system, comparing actual brake balance to a desired brake balance, determining if front axle wheels or rear axle wheels are overbraked as compared to the desired brake balance, and adjusting regenerative braking and non-regenerative braking levels.

18. The method of claim 17, wherein the step of controlling the vehicle comprises using a simple proportional-integral-derivative feedback controller.

19. The method of claim 17, wherein the step of adjusting regenerative braking and non-regenerative braking levels is accomplished over a period of time that provides a quick return to balanced braking and allows a switch between regenerative braking and non-regenerative braking to be smooth.

20. The method of claim 17, wherein the step of adjusting regenerative braking and non-regenerative braking levels is accomplished over a period of time between 50 msec and 1 sec.

21. The method of claim 17, wherein: regenerative braking is applied to the rear axle wheels; and the non-regenerative brakes are connected to the front axle wheels.

22. The method of claim 21, wherein the step of adjusting regenerative braking and non-regenerative braking levels comprises the step of: reducing regenerative braking when the yaw stability control system determines the vehicle is experiencing said oversteer condition and the rear axle wheels are overbraked relative to the front axle wheels.

23. The method of claim 21, wherein the step of adjusting regenerative braking and non-regenerative braking levels comprises the step of: maintaining regenerative braking when the yaw stability control system determines the vehicle is experiencing said understeer condition.

24. The method of claim 21, wherein the step of adjusting regenerative braking arid non-regenerative braking levels comprises the step of: maintaining regenerative braking when the yaw stability control system determines the vehicle is experiencing said oversteer condition and the rear axle wheels are not overbraked relative to the front axle wheels.

25. The method of claim 21, wherein: the non-regenerative brakes are also connected to the rear axle wheels; and the step of adjusting regenerative braking and non-regenerative braking levels comprises switching from regenerative braking to non-regenerative braking at the rear axle wheels when the yaw stability control system determines the vehicle is experiencing said understeer condition.

26. The method of claim 21, wherein: the non-regenerative brakes are also connected to the rear axle wheels; and the step of adjusting regenerative braking and non-regenerative braking levels comprises switching from regenerative braking to non-regenerative braking at the rear axle wheels when the yaw stability control system determines the vehicle is experiencing said oversteer condition and the rear axle wheels are not overbraked relative to the front axle wheels.

27. The method of claim 17, wherein: regenerative braking is applied to the front axle wheels: and the non-regenerative brakes are connected to the rear axle wheels.

28. The method of claim 27, wherein the step of adjusting regenerative braking arid non-regenerative braking levels comprises the step of: reducing regenerative braking when the yaw stability control system determines the vehicle is experiencing said understeer condition and the front axle wheels are overbraked relative to the rear axle wheels.

29. The method of claim 27, wherein the step of adjusting regenerative braking and non-regenerative braking levels comprises the step of: maintaining regenerative braking when the yaw stability control system determines the vehicle is experiencing said oversteer condition.

30. The method of claim 27, wherein the step of adjusting regenerative braking and non-regenerative braking levels comprises the step of: maintaining regenerative braking when the yaw stability control system determines the vehicle is experiencing said understeer condition and the front axis wheels are not overbraked relative to the rear axle wheels.

31. The method of claim 27, wherein: the non-regenerative brakes are also connected to the front axle wheels; and the step of adjusting regenerative braking and non-regenerative braking levels comprises switching from regenerative braking to non-regenerative braking at the front axle wheels when the yaw stability control system determines the vehicle is experiencing said oversteer condition.

32. The method of claim 27, wherein: the non-regenerative brakes are also connected to the front axle wheels; and the step of adjusting regenerative braking and non-regenerative braking levers comprises switching from regenerative braking to non-regenerative braking at the front axle wheels when the yaw stability control system determines the vehicle is experiencing said understeer condition and the front axle wheels are not overbraked relative to the rear axle wheels.

* * * * *